United States Patent
Takeda et al.

(10) Patent No.: US 11,377,569 B2
(45) Date of Patent: Jul. 5, 2022

(54) ELECTRICAL STEEL SHEET AND METHOD FOR MANUFACTURING THE SAME

(75) Inventors: Kazutoshi Takeda, Tokyo (JP); Kenji Kosuge, Tokyo (JP); Tatsuya Takase, Tokyo (JP); Kohji Muneda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 844 days.

(21) Appl. No.: 13/809,279

(22) PCT Filed: Jul. 15, 2011

(86) PCT No.: PCT/JP2011/066224
§ 371 (c)(1),
(2), (4) Date: Jan. 9, 2013

(87) PCT Pub. No.: WO2012/011442
PCT Pub. Date: Jan. 26, 2012

(65) Prior Publication Data
US 2013/0115443 A1 May 9, 2013

(30) Foreign Application Priority Data
Jul. 23, 2010 (JP) .............................. JP2010-166119

(51) Int. Cl.
*C09D 7/61* (2018.01)
*C21D 8/12* (2006.01)
(Continued)

(52) U.S. Cl.
CPC ................. *C09D 7/61* (2018.01); *B05D 7/14* (2013.01); *C09D 5/084* (2013.01); *C09D 7/65* (2018.01);
(Continued)

(58) Field of Classification Search
None
See application file for complete search history.

(56) References Cited

U.S. PATENT DOCUMENTS

| | | | |
|---|---|---|---|
| 3,783,034 A | 1/1974 | Kitayama et al. | |
| 3,793,073 A | 2/1974 | Kitayama et al. | |

(Continued)

FOREIGN PATENT DOCUMENTS

| | | |
|---|---|---|
| CN | 1219559 A | 6/1999 |
| CN | 1227860 A | 9/1999 |

(Continued)

OTHER PUBLICATIONS

PBS, The Elements of Steel. Retreived on Oct. 30, 2014. http://www.pbs.org/wgbh/americanexperience/features/general-article/streamliners-steel/.*

(Continued)

*Primary Examiner* — Vivian Chen
(74) *Attorney, Agent, or Firm* — Birch, Stewart, Kolasch & Birch, LLP (57) ABSTRACT

An electrical steel sheet (10) is provided with a base iron (1) and an insulating film (2) formed on a surface of the base iron (1). The insulating film (2) contains: a first component: 100 parts by mass, the first component containing: a metal phosphate: 100 parts by mass; and one kind selected from a group consisting of an acrylic resin, an epoxy resin and a polyester resin which have an average particle size of 0.05 μm to 0.50 μm, or a mixture or copolymer of two or three kinds selected from the group: 1 part by mass to 50 parts by mass; and a second component composed of dispersion or powder of a fluorine resin having an average particle size of 0.05 μm to 0.35 μm: 0.5 parts by mass to 10 parts by mass.

1 Claim, 1 Drawing Sheet

(51) Int. Cl.

| | | |
|---|---|---|
| C21D 9/46 | (2006.01) | |
| H01F 1/18 | (2006.01) | |
| C09D 5/08 | (2006.01) | |
| C22C 38/02 | (2006.01) | |
| C22C 38/04 | (2006.01) | |
| C22C 38/06 | (2006.01) | |
| B05D 7/14 | (2006.01) | |
| C23C 22/74 | (2006.01) | |
| C09D 7/65 | (2018.01) | |
| C09D 7/40 | (2018.01) | |
| H01B 7/02 | (2006.01) | |
| C09D 1/00 | (2006.01) | |
| C09D 127/18 | (2006.01) | |
| C09D 167/00 | (2006.01) | |
| C09D 127/12 | (2006.01) | |
| C09D 133/00 | (2006.01) | |
| C09D 163/00 | (2006.01) | |
| C09D 127/04 | (2006.01) | |
| C08K 3/22 | (2006.01) | |
| C08K 3/02 | (2006.01) | |
| B05D 3/02 | (2006.01) | |

(52) U.S. Cl.
CPC .............. *C09D 7/67* (2018.01); *C09D 7/68* (2018.01); *C21D 8/12* (2013.01); *C21D 8/1283* (2013.01); *C21D 9/46* (2013.01); *C22C 38/02* (2013.01); *C22C 38/04* (2013.01); *C22C 38/06* (2013.01); *C23C 22/74* (2013.01); *H01B 7/02* (2013.01); *H01F 1/18* (2013.01); *B05D 3/0254* (2013.01); *B05D 2502/00* (2013.01); *B05D 2504/00* (2013.01); *B05D 2506/10* (2013.01); *B05D 2508/00* (2013.01); *C08K 2003/026* (2013.01); *C08K 2003/2237* (2013.01); *C08K 2003/2258* (2013.01); *C09D 1/00* (2013.01); *C09D 7/40* (2018.01); *C09D 127/04* (2013.01); *C09D 127/12* (2013.01); *C09D 127/18* (2013.01); *C09D 133/00* (2013.01); *C09D 163/00* (2013.01); *C09D 167/00* (2013.01); *C21D 2201/05* (2013.01); *C21D 2211/005* (2013.01); *Y10T 428/254* (2015.01); *Y10T 428/3154* (2015.04); *Y10T 428/31511* (2015.04); *Y10T 428/31529* (2015.04); *Y10T 428/31681* (2015.04); *Y10T 428/31699* (2015.04)

(56) References Cited

U.S. PATENT DOCUMENTS

| | | | | |
|---|---|---|---|---|
| 4,038,234 A * | 7/1977 | Birchall | ............... | C08K 3/32 524/380 |
| 4,043,966 A * | 8/1977 | Edwards | ............... | C09D 127/12 524/417 |
| 4,352,899 A * | 10/1982 | Tada | ............... | B23K 35/226 523/451 |
| 5,945,212 A | 8/1999 | Tanaka et al. | | |
| 5,955,201 A * | 9/1999 | Loudermilk | ............... | H01F 1/18 428/450 |
| 6,139,650 A * | 10/2000 | Oda | ............... | C22C 38/02 148/306 |
| 6,159,534 A * | 12/2000 | Takeda | ............... | C21D 8/1283 427/127 |
| 6,383,650 B1 * | 5/2002 | Takeda | ............... | B32B 15/04 428/457 |
| 6,509,099 B1 * | 1/2003 | Urata | ............... | B05D 7/14 428/423.1 |
| 6,537,678 B1 * | 3/2003 | Putnam | ............... | C09D 5/084 106/14.05 |
| 6,562,474 B1 * | 5/2003 | Yoshimi | ............... | B05D 5/00 428/472.3 |
| 6,638,633 B1 | 10/2003 | Komori et al. | | |
| 7,226,658 B2 | 6/2007 | Sashi et al. | | |
| 10,340,065 B2 * | 7/2019 | Takeda | ............... | C09D 7/61 |
| 10,669,432 B2 * | 6/2020 | Takeda | ............... | H01F 1/18 |
| 2002/0192511 A1 * | 12/2002 | Hruschka | ............... | C04B 28/34 428/704 |
| 2003/0034092 A1 * | 2/2003 | Takashima | ............... | C21D 8/1255 148/111 |
| 2003/0175524 A1 * | 9/2003 | Sashi | ............... | H01F 1/14783 428/421 |
| 2003/0194433 A1 * | 10/2003 | Hei | ............... | B65G 45/02 424/465 |
| 2004/0046632 A1 * | 3/2004 | Kumano | ............... | C23C 18/127 336/233 |
| 2004/0104378 A1 * | 6/2004 | Bhatia | ............... | C09D 5/084 252/389.54 |
| 2004/0262580 A1 * | 12/2004 | Yu | ............... | C23F 11/10 252/389.1 |
| 2006/0014092 A1 * | 1/2006 | Nukada et al. | ............... | 430/60 |
| 2006/0063881 A1 * | 3/2006 | Bhattacharya | ............... | C09D 129/14 524/502 |
| 2007/0087201 A1 * | 4/2007 | Wimmer | ............... | C21D 8/1283 428/413 |
| 2007/0231463 A1 * | 10/2007 | Huang | ............... | C08G 59/4021 427/58 |
| 2008/0190520 A1 * | 8/2008 | Watanabe | ............... | C21D 8/1283 148/537 |
| 2008/0226863 A1 * | 9/2008 | Prunchak | ............... | B32B 17/10889 428/98 |
| 2008/0311413 A1 * | 12/2008 | Boehm | ............... | C09D 175/04 428/457 |
| 2009/0208764 A1 * | 8/2009 | Tanaka | ............... | C23C 22/62 428/472.2 |
| 2009/0226742 A1 * | 9/2009 | Blum | ............... | C09D 183/04 428/447 |
| 2009/0233114 A1 * | 9/2009 | Takeda | ............... | C21D 8/1288 428/472.3 |
| 2010/0221549 A1 * | 9/2010 | Shigekuni | ............... | C23C 26/00 428/412 |
| 2011/0170814 A1 * | 7/2011 | Nakamura | ............... | F16F 1/3605 384/125 |
| 2011/0212335 A1 * | 9/2011 | Takeda et al. | ............... | 428/458 |
| 2018/0022927 A1 * | 1/2018 | Takeda | ............... | C22C 38/04 428/418 |
| 2019/0367746 A1 * | 12/2019 | Takeda | ............... | C09D 1/00 |

FOREIGN PATENT DOCUMENTS

| | | | |
|---|---|---|---|
| CN | 1257136 A | | 6/2000 |
| CN | 1568528 A | | 1/2005 |
| EP | 1291451 A1 | | 3/2003 |
| JP | 49-19078 | | 5/1974 |
| JP | 50-15013 | | 6/1975 |
| JP | 54-43823 A | | 4/1979 |
| JP | 58-198573 A | * | 11/1983 |
| JP | 60-38068 A | | 2/1985 |
| JP | 3-36284 A | | 2/1991 |
| JP | 6-330338 A | | 11/1994 |
| JP | 9-323066 A | | 12/1997 |
| JP | 2002047576 A | * | 2/2002 |
| JP | 2002-080979 A | * | 3/2002 |
| JP | 2002-155375 A | * | 5/2002 |
| JP | 2002-164207 A | | 6/2002 |
| JP | 2002-309379 A | | 10/2002 |
| JP | 2003-293101 A | * | 10/2003 |
| JP | 2006-19643 A | | 1/2005 |
| WO | WO 2006/049935 A1 | | 5/2006 |
| WO | WO 2009/082088 A | * | 7/2009 |
| WO | WO 2010061722 | * | 6/2010 |

(56) References Cited

OTHER PUBLICATIONS

Total Materia—Steel Composition. Retrieved on Oct. 30, 2014. http://keytometals.com/page.aspx?ID=SteelComposition&LN=EN.*
Carlson et al., Fluoropolymers, Organic (Carlson), Ullman's Encyclopedia of industrial chemistry. Jun. 15, 2000 https://doi.org/10.1002/14356007.a11_393 (Year: 2000).*
Takahashi, JP 2002047576A machine translation. Feb. 15, 2002. (Year: 2002).*
Forms PCT/IB/338, PCT/IB/373, and PCT/ISA/237, mailed Feb. 21, 2013, for International Application No. PCT/JP2011/066224.
Chinese Office Action dated Feb. 20, 2014, issued in corresponding Chinese Patent Application No. 201180036048.2.
International Search Report issued in PCT/JP2011/066224 dated Oct. 18, 2011.
Database WPI Week 200516, Thomson Scientific, London, GB; AN 2005-145565, XP-002733360, 2 pages.
Extended European Search Report for European Application No. 11809612.2, dated Jan. 19, 2015.

\* cited by examiner

ELECTRICAL STEEL SHEET AND METHOD FOR MANUFACTURING THE SAME

TECHNICAL FIELD

The present invention relates to an electrical steel sheet suitable for a material of an iron core of an electric equipment and so on and a method for manufacturing the same.

BACKGROUND ART

When a motor and a transformer are manufactured by using an electrical steel sheet, the electrical steel sheet in a hoop shape is punched into a predetermined shape, and thereafter, electrical steel sheets are laminated and fixed so as to manufacture a laminated iron core. Thereafter, a copper wire is wound around teeth or the like of the laminated iron core. Then, there is a case when a resin molding is performed aiming for improvement of durability, weather resistance, and so on according to usages thereof.

It is important to closely adhere a molding resin to the laminated iron core. This is because objects such as the improvement in durability and weather resistance cannot be attained if the molding resin does not closely adhere to the laminated iron core. Besides, in a motor using a magnet, the magnet is fixed to the motor by using the molding resin, but the fixing of the magnet becomes insufficient if the adhesiveness is low.

On the other hand, it turns out that various problems occur during a manufacturing process of the motor and so on when the adhesiveness between the molding resin and the laminated iron core is too high. For example, in a motor and so on used for a vehicle, there is a case when a compressive stress acts on the laminated iron core from the molding resin, and iron loss increases. In other words, if the molding resin and an exposed part of the laminated iron core are adhered in a case where the resin molding has been performed after a conductive part such as a coil is attached to the laminated iron core, there is a case where the compressive stress from the molding resin acts on the laminated iron core and performance of the motor is lowered caused by deterioration of the iron loss. Besides, when the magnet is fixed to the motor with the molding resin, it is difficult to remove the molding resin adhered to unnecessary portions if the adhesiveness between the molding resin and the laminated iron core is too high.

CITATION LIST

Patent Literature

Patent Literature 1: Japanese Examined Patent Application Publication No. 50-15013
Patent Literature 2: Japanese Laid-open Patent Publication No. 03-36284
Patent Literature 3: Japanese Examined Patent Application Publication No. 49-19078
Patent Literature 4: Japanese Laid-open Patent Publication No. 06-330338
Patent Literature 5: Japanese Laid-open Patent Publication No. 09-323066
Patent Literature 6: Japanese Laid-open Patent Publication No. 2002-309379
Patent Literature 7: Japanese Laid-open Patent Publication No. 2002-164207

SUMMARY OF INVENTION

Technical Problem

An object of the present invention is to provide an electrical steel sheet capable of improving removability of a molding resin, and a method for manufacturing the same.

Solution to Problem

The present inventors studied about factors deteriorating the removability of the molding resin, and as a result, they found that adhesiveness between an insulating film provided at a surface of an electrical steel sheet and the molding resin is excessively high. The insulating film is provided mainly to secure insulating properties between the laminated electrical steel sheets. Besides, there is a case when various properties such as corrosion resistance, weldability, adhesiveness, heat resistance are required for the insulating film in addition to the insulation performance. In general, a mixture of which major constituents are inorganic acid salts such as chromate and phosphate, and an organic resin is coated to form the insulating film. Various technologies are known as for the insulating film of the electrical steel sheet. In recent years, development of an insulating film has been advanced in which a chromic acid solution containing hexavalent chromium is not used from raising consciousness on environmental problems.

However, in a conventional insulating film, the removability of the molding resin is not focused even if the properties such as the insulation performance are sufficient, and there are various problems in accordance with the lowness of the removability of the molding resin as stated above.

The present inventors studied hard to solve the above-stated problems, and as a result, they thought out the following aspects.

(1) An electrical steel sheet, including:
 a base iron; and
 an insulating film formed on a surface of the base iron,
 wherein the insulating film contains:
 a first component: 100 parts by mass, the first component containing:
  a metal phosphate: 100 parts by mass; and
  one kind selected from a group consisting of an acrylic resin, an epoxy resin and a polyester resin which have an average particle size of 0.05 µm to 0.50 µm, or a mixture or copolymer of two or three kinds selected from the group: 1 part by mass to 50 parts by mass; and
 a second component composed of dispersion or powder of a fluorine resin having an average particle size of 0.05 µm to 0.35 µm: 0.5 parts by mass to 10 parts by mass.

(2) An electrical steel sheet, including:
 a base iron; and
 an insulating film formed on a surface of the base iron,
 wherein the insulating film contains:
 a first component: 100 parts by mass, the first component containing:
  a colloidal silica: 100 parts by mass; and
  one kind selected from a group consisting of an acrylic resin, an epoxy resin and a polyester resin which have an average particle size of 0.05 µm to 0.50 µm, or a mixture or copolymer of two or three kinds selected from the group: 40 parts by mass to 400 parts by mass; and a second component composed of dispersion or powder of a fluorine resin having an average particle size of 0.05 μm to 0.35 μm: 0.5 parts by mass to 10 parts by mass.

(3) The electrical steel sheet according to (1) or (2), wherein the first component and the second component account for 90% or more of the insulating film.

(4) A method for manufacturing an electrical steel sheet, including:

applying a treatment solution on a surface of a base iron; and baking and drying the treatment solution, wherein the treatment solution contains:

a first component: 100 parts by mass in solid content, the first component containing:

a metal phosphate: 100 parts by mass; and one kind selected from a group consisting of an acrylic resin, an epoxy resin and a polyester resin which have an average particle size of 0.05 μm to 0.50 μm, or a mixture or copolymer of two or three kinds selected from the group: 1 part by mass to 50 parts by mass; and a second component composed of dispersion or powder of a fluorine resin having an average particle size of 0.05 μm to 0.35 μm: 0.5 parts by mass to 10 parts by mass in resin solid content.

(5) A method for manufacturing an electrical steel sheet, including:

applying a treatment solution on a surface of a base iron; and baking and drying the treatment solution, wherein the treatment solution contains:

a first component: 100 parts by mass in solid content, the first component containing:

a colloidal silica: 100 parts by mass; and one kind selected from a group consisting of an acrylic resin, an epoxy resin and a polyester resin which have an average particle size of 0.05 μm to 0.50 μm, or a mixture or copolymer of two or three kinds selected from the group: 40 parts by mass to 400 parts by mass; and a second component composed of dispersion or powder of a fluorine resin having an average particle size of 0.05 μm to 0.35 μm: 0.5 parts by mass to 10 parts by mass in resin solid content.

(6) The method for manufacturing an electrical steel sheet according to (4) or (5), wherein a temperature to be reached in the baking and drying is 150° C. to 350° C., and a time therefor is 5 seconds to 60 seconds.

(7) The method for manufacturing the electrical steel sheet according to (4) or (5), wherein the first component and the second component account for 90% or more of the treatment solution when it is converted into a solid content.

Advantageous Effects of Invention

According to the present invention, an appropriate insulating film is provided, and therefore, it is possible to obtain high removability of a molding resin while insulation performance and so on are kept high.

DESCRIPTION OF EMBODIMENTS

Figure 1:
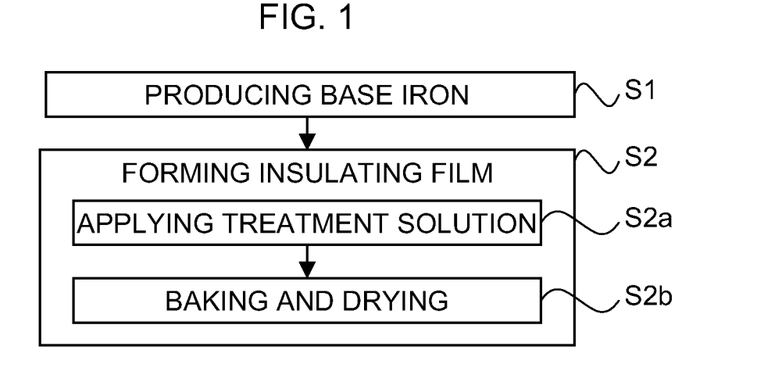
FIG. 1 is a flowchart illustrating a method for manufacturing an electrical steel sheet according to an embodiment of the present invention.
Figure 2:
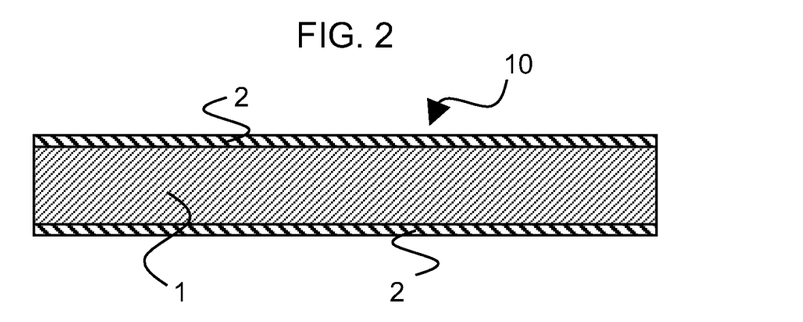
FIG. 2 is a cross-sectional view illustrating a structure of an electrical steel sheet according to an embodiment of the present invention.

Hereinafter, embodiments of the present invention will be described with reference to the attached drawings. FIG. 1 is a flowchart illustrating a method for manufacturing an electrical steel sheet according to an embodiment of the present invention, and FIG. 2 is a cross-sectional view illustrating a structure of the electrical steel sheet according to an embodiment of the present invention.

In the present embodiment, first, a base iron 1 is produced (step S1). For example, in production of the base iron 1, first, a slab with a predetermined composition is heated at approximately 1050° C. to 1250° C., and is hot-rolled so as to produce a hot-rolled steel sheet, and the hot-rolled steel sheet is coiled. Then, the hot-rolled steel sheet is cold-rolled while being uncoiled so as to produce a cold-rolled steel sheet with a thickness of approximately 0.15 mm to 0.5 mm, and the cold-rolled steel sheet is coiled. Thereafter, the cold-rolled steel sheet is annealed (finish annealed) at 750° C. to 1100° C. Thus, the base iron 1 is obtained. Incidentally, the steel sheet may be annealed in the range of 800° C. to 1050° C. as necessary before the cold-rolling.

The composition of the base iron 1 is one suitable for a non-oriented electrical steel sheet, for example. Specifically, the base iron 1 contains, for example, Si: 0.1 mass % or more and Al: 0.05 mass % or more with the balance being composed of Fe and inevitable impurities. Incidentally, Mn: 0.01 mass % or more and 1.0 mass % or less may be contained in addition to Si and Al. Besides, Sn: 0.01 mass % or more and 1.0 mass % or less may be contained. Further, the contents of representative elements such as S, N and C are preferable to be less than 100 ppm, and more preferable to be less than 20 ppm. The higher the content of Si is, the higher its electric resistance is and the higher its magnetic property is. However, when the content of Si is more than 4.0 mass %, the brittleness may be significant. Accordingly, the Si content is preferable to be 4.0 mass % or less. Besides, the higher the content of Al is, the higher its magnetic property is. However, when the content of Al is more than 3.0 mass %, the cold-rolling when the base iron 1 is produced may be difficult. Accordingly, the Al content is preferable to be 3.0 mass % or less.

Incidentally, the composition of the base iron 1 may be one suitable for a grain-oriented electrical steel sheet.

Besides, the lower the surface roughness of the base iron 1 is, the higher the adhesiveness between electrical steel sheets in a laminated iron core is. Accordingly, the centerline average roughness (Ra) in the rolling direction of the base iron 1 and in a direction (width direction) orthogonal to the rolling direction is preferable to be 1.0 μm or lower, and more preferable to be 0.5 μm or lower. When the centerline average roughness (Ra) is higher than 1.0 μm, the adhesiveness between electrical steel sheets is low, with which it is difficult to obtain high heat conductivity in a lamination direction. Incidentally, it may be necessary to strictly perform control of the cold-rolling to make the centerline average roughness (Ra) be lower than 0.1 μm, which often leads to high costs. Accordingly, it is preferable that the centerline average roughness (Ra) be 0.1 μm or more.

Then, as illustrated in FIG. 2, an insulating film 2 is formed on a surface of the base iron 1 (step S2). In formation of the insulating film 2, a certain treatment solution is applied on the surface of the base iron 1 (step S2a), and thereafter the treatment solution is dried by heating (step S2b). As a result, the components in the treatment solution are baked onto the surface of the base iron 1. The method of applying the treatment solution is not particularly limited.

For example, the treatment solution may be applied using a roll coater or spray, or the base iron 1 may be dipped into the treatment solution. The method of drying the treatment solution is also not particularly limited. For example, an ordinary radiation furnace or air heating furnace may be used to dry the treatment solution, or the treatment solution may be dried by heating using electric energy such as induction heating and high-frequency heating. Regarding the conditions of the drying and baking of the treatment solution (step S2b), the temperature (baking temperature) for the treatment is preferable to be at 150° C. to 350° C., in particular, the baking temperature is preferable to be at 230° C. to 300° C. when a metal phosphate is contained in the treatment solution as described later. Besides, the time for this treatment is preferable to be 5 seconds to 60 seconds when a metal phosphate is contained in the treatment solution, and preferable to be 3 seconds to 60 seconds when a colloidal silica is contained in the treatment solution.

Incidentally, pretreatment may be performed on the surface of the base iron 1 before applying the treatment solution. For example, a degreasing treatment using an alkaline chemical agent or the like, an acid cleaning treatment using hydrochloric acid, sulfuric acid, phosphoric acid or the like, and so on may be cited as the pretreatment.

Here, the treatment solution used for forming the insulating film 2 will be described. To classify broadly, the following two kinds ((a), (b)) may be used as the treatment solution.

(a) A treatment solution containing:
 a first component: 100 parts by mass in solid content, the first component containing:
  a metal phosphate: 100 parts by mass; and
  one kind selected from a group consisting of an acrylic resin, an epoxy resin and a polyester resin which have an average particle size of 0.05 μm to 0.50 μm, or a mixture or copolymer of two or three kinds selected from the group: 1 part by mass to 50 parts by mass; and
 a second component composed of dispersion or powder of a fluorine resin having an average particle size of 0.05 μm to 0.35 μm: 0.5 parts by mass to 10 parts by mass in resin solid content.

(b) A treatment solution containing:
 a first component: 100 parts by mass in solid content, the first component containing:
  a colloidal silica: 100 parts by mass; and
  one kind selected from a group consisting of an acrylic resin, an epoxy resin and a polyester resin which have an average particle size of 0.05 μm to 0.50 μm, or a mixture or copolymer of two or three kinds selected from the group: 40 parts by mass to 400 parts by mass; and
 a second component composed of dispersion or powder of a fluorine resin having an average particle size of 0.05 μm to 0.35 μm: 0.5 parts by mass to 10 parts by mass in resin solid content.

Incidentally, the total amount of the first component and the second component is preferable to be 90% or more of the entire treatment solution when it is converted into a solid content. This is to secure good insulation performance, heat conductivity, heat resistance, and so on of the insulating film.

Regarding the first component, the metal phosphate is one to be the solid content when an aqueous solution of which major constituents are phosphoric acid and metal ions is dried. The kind of the phosphoric acid composing the metal phosphate is not particularly limited, and for example, an orthophosphoric acid, a metaphosphoric acid, a polyphosphoric acid, or the like may be used. The kind of metal ions composing the metal phosphate is also not particularly limited, and Li, Al, Mg, Ca, Sr, Ti, Ni, Mn, Co and so on are preferable, where Al, Ca, Mn and Ni are particularly preferable. Further, it is preferable to prepare the metal phosphate solution by mixing an oxide of a metal ion, a carbonate, and/or a hydroxide in an orthophosphoric acid, for example.

As the metal phosphate, just one kind may be used, or two or more kinds may be mixed and used. The first component may be composed of only the metal phosphate, or may contain additives such as phosphonic acid and/or boric acid.

Regarding the first component, as the colloidal silica, it is preferable to use, for example, one having an average particle size of 5 nm to 40 nm and having an Na content of 0.5 mass % or less. Further, the Na content of the colloidal silica is more preferable to be 0.01 mass % to 0.3 mass %.

In the present embodiment, the first component contains an emulsion of an acrylic resin, an epoxy resin and/or a polyester resin. A commercially available resin emulsion may be used as the emulsion of the acrylic resin, the epoxy resin and/or the polyester resin. The melting points of the acrylic resin, the epoxy resin and/or the polyester resin are not particularly limited, and are preferable to be 50° C. or lower. When the melting points are higher than 50° C., they are likely to generate powder. Further, in view of costs, the melting points are preferable to be 0° C. or higher.

As the acrylic resin, it is preferable to be methyl acrylate, ethyl acrylate, n-butyl acrylate, butyl acrylate, n-octyl acrylate, i-octyl acrylate, 2-ethylhexyl acrylate, n-nonyl acrylate, n-decyl acrylate, n-dodecyl acrylate, and the like, which are normal monomers. As the acrylic resin, it is also preferable to be ones obtained by copolymerizing acrylic acid, methacrylic acid, maleic acid, maleic anhydride, fumaric acid, crotonic acid, and itaconic acid, which are monomers having a functional group, as well as 2-hydroxylethyl(metha)acrylate, 2-hydroxylpropyl (metha)acrylate, 3-hydroxylbutyl (metha)acrylate, 2-hydroxylethyl (metha)allylether, and so on, which are monomers having a hydroxyl group.

As the epoxy resin, for example, there are ones obtained by bringing a carboxylic anhydride into reaction with an amine-denatured epoxy resin. Specifically, there are bisphenol A-diglycidyl ether, a ring-opening adduct of caprolactone of bisphenol A-diglycidyl ether, bisphenol F-diglycidyl ether, bisphenol S-diglycidyl ether, novolac glycidyl ether, dimer acid glycidyl ether, and the like. As the amine for denaturing, there are isopropanolamine, monopropanolamine, monobutanolamine, monoethanolamine, diethylenetriamine, ethylenediamine, butalamine, propylamine, isophoronediamine, tetrahydrofurfurylamine, xylenediamine, hexylamine, nonylamine, triethylenetetramine, tetramethylenepentamine, diaminodiphenylsulfone, and the like. As the carboxylic anhydride, ones obtained by reaction with succinic anhydride, itaconic anhydride, maleic anhydride, citraconic anhydride, phthalic anhydride, trimellitic anhydride, or the like are preferable.

As the polyester resin, for example, one obtained by bringing a dicarboxylic acid into reaction with a glycol is preferable. As the dicarboxylic acid, there are terephthalic acid, isophthalic acid, orthophthalic acid, naphthalene dicarboxylic acid, biphenyl dicarboxylic acid, succinic acid, adipic acid, sebacic acid, fumaric acid, maleic acid, maleic anhydride, itaconic acid, citraconic acid, and the like. As the glycol, there are ethylene glycol, 1,2-propylene glycol, 1,3-propanediol, 1,4-butanediol, 1,5-pentanediol, neopentyldiol, 1,6-hexanediol, triethylene glycol, dipropylene glycol, polyethylene glycol, and the like. Ones obtained by graft polymerizing acrylic acid, methacrylic acid, maleic acid, fumaric acid, itaconic acid, citraconic acid, or methacrylic acid anhydride, or the like with these polyester resins may also be used.

As the acrylic resin, the epoxy resin, and the polyester resin, just one kind may be used, or two or more kinds may be mixed and used. Note that as these organic resins, ones having an average particle size of 0.05 µm to 0.50 µm are used. When the average particle size is smaller than 0.05 µm, it aggregates easily in the treatment solution, and the evenness of the insulating film 2 decreases easily. On the other hand, when the average particle size is larger than 0.50 µm, stability of the treatment solution decreases easily. If the stability of the treatment solution decreases, there are possibilities in which aggregates are generated in the treatment solution, pipes and/or pumps are clogged, and the aggregates enter into the insulating film 2 to generate a defect in the insulating film 2. Besides, the average particle size of these organic resins is preferable to be 0.1 µm or more and preferable to be 0.3 µm or less. Incidentally, as for the average particle size, for example, a number average particle size regarding particles having a particle size of 1 µm or less may be used.

Regarding the mixing ratio of the metal phosphate with the acrylic resin, the epoxy resin, and the polyester resin, the total amount of the acrylic resin, the epoxy resin, and the polyester resin relative to 100 parts by mass of the metal phosphate is 1 part by mass to 50 parts by mass. When the total amount of the acrylic resin, the epoxy resin, and the polyester resin is less than 1 part by mass, an aggregation of the acrylic resin, the epoxy resin, and the polyester resin occurs easily, and the evenness of the insulating film 2 decreases easily. On the other hand, when the total amount of the acrylic resin, the epoxy resin, and the polyester resin is more than 50 parts by mass, heat resistance may be poor.

Besides, regarding the mixing ratio of the colloidal silica with the acrylic resin, the epoxy resin, and the polyester resin, the total amount of the acrylic resin, the epoxy resin, and the polyester resin relative to 100 parts by mass of the colloidal silica is 40 parts by mass to 400 parts by mass. When the total amount of the acrylic resin, the epoxy resin, and the polyester resin is less than 40 parts by mass, it is difficult to properly form the insulating film 2, and there is a possibility in which the insulating film 2 generates powder. On the other hand, when the total amount of the epoxy resin and the polyester resin is more than 400 parts by mass, the heat resistance may be poor.

Regarding the second component, for example, polytetrafluoroethylene, tetrafluoroethylene-perfluoroalkylvinyl ether copolymer, tetra fluoroethylene-hexafluoropropylene copolymer, tetrafluoroethylene-ethylene copolymer, polychlorotrifluoroethylene, polyvinylidene fluoride, tetrafluoroethylene-hexafluoropropylene-perfluoroalkyl vinyl ether copolymer, chlorotrifluoroethylene-ethylene copolymer, polyvinyl fluoride, and so on can be used as the fluorine resin.

Incidentally, when the fluorine resin to which the hydroxyl group is grafted or which is epoxy-denatured or the like is used, there is a tendency in which the removability of the molding resin deteriorates. Accordingly, it is preferable to use the fluorine resin other than the fluorine resin to which the hydroxyl group is grafted or which is epoxy-denatured.

As the dispersion or powder of the fluorine resin, one having the average particle size of 0.05 µm to 0.35 µm is used. When the average particle size of the dispersion or powder of the fluorine resin is less than 0.05 µm, enough dispersibility cannot be obtained to be easy to aggregate in the treatment solution, and the evenness of the insulating film 2 decreases easily. As a result, there is a case when enough properties such as the insulation performance cannot be obtained. Besides, when the average particle size is larger than 0.35 µm, stability of the treatment solution decreases easily. Besides, the average particle size of the dispersion or powder of the fluorine resin is preferable to be 0.15 µm or more and preferable to be 0.25 µm or less.

Incidentally, the dispersion or powder of the fluorine resin may be used independently or two or more kinds may be mixed and used. For example, plural kinds of dispersion or powder having different average particle sizes may be mixed and used, or plural kinds of dispersions or powders having different molecular weights may be mixed and used. Besides, the dispersion of the fluorine resin and the powder of the fluorine resin may be mixed and used.

Regarding the blending ratio of the first component and the second component, the amount of the second component relative to the 100 parts by mass in solid content of the first component is 0.5 parts by mass to 10 parts by mass whether the major constituent of the first component is the metal phosphate or the colloidal silica. When the amount of the second component is less than 0.5 parts by mass, there is a possibility in which the effect improving the removability of the molding resin is not sufficient. On the other hand, when the amount of the second component is higher than 10 parts by mass, there is a possibility in which the stability of the treatment solution deteriorates. As stated above, if the stability of the treatment solution decreases, there are possibilities in which aggregates are generated in the treatment solution, pipes and/or pumps are clogged, and the aggregates enter into the insulating film 2 to generate a defect in the insulating film 2. Besides, the fluorine resin has a tendency particularly aggregating at an interface different from the other organic resins, and therefore, there is a possibility in which the adhesiveness with the base iron 1 is insufficient when the amount of the second component exceeds 10 parts by mass.

Incidentally, additives such as a surfactant may be added to the above-described treatment solution. As the surface active agent, non-ion surfactants are preferable, and a brightener, an antiseptic, an antioxidant, and the like may be added in addition to the above.

Besides, the other components may be added to the above-described treatment solution. For example, an inorganic compound such as carbonate, hydroxide, oxide, titanate, and tungstate may be added, and an organic low-molecular compound such as polyol, cellosolve, carboxylic acids, ethers, and esters may be added. Further, both of the inorganic compound and the organic low-molecular compound may be added.

In the electrical steel sheet 10 manufactured as stated above, the insulating film 2 contains, when the treatment solution (a) is used:
  a first component: 100 parts by mass, the first component containing:
    a metal phosphate: 100 parts by mass; and
    one kind selected from a group consisting of an acrylic resin, an epoxy resin and a polyester resin which have an average particle size of 0.05 µm to 0.50 µm, or a mixture or copolymer of two or three kinds selected from the group: 1 part by mass to 50 parts by mass; and
  a second component composed of dispersion or powder of a fluorine resin having an average particle size of 0.05 µm to 0.35 µm: 0.5 parts by mass to 10 parts by mass.

Besides, the insulating film 2 contains, when the treatment solution (b) is used:

a first component: 100 parts by mass, the first component containing:

a colloidal silica: 100 parts by mass; and one kind selected from a group consisting of an acrylic resin, an epoxy resin and a polyester resin which have an average particle size of 0.05 µm to 0.50 µm, or a mixture or copolymer of two or three kinds selected from the group: 40 parts by mass to 400 parts by mass; and a second component composed of particles of one or more kinds selected from a group consisting of a polyolefin wax, an epoxy resin and an acrylic resin, the particles having an average particle size of 2.0 µm to 15.0 µm and a melting point of 60° C. to 140° C.: 5 parts by mass to 45 parts by mass in resin solid content.

Besides, one in which the fluorine resin is dispersed inside is obtained as the insulating film 2. Dispersibility in the treatment solution is extremely good when the average particle size of the dispersion or powder of the fluorine resin is 0.05 µm to 0.35 µm, and therefore, the dispersibility of the fluorine resin in the insulating film 2 is extremely good, and a substantial surface tension moderately decreases for a whole of the insulating film 2. As a result, the removability of the molding resin improves. In other words, in the electrical steel sheet 10 including the insulating film 2 as stated above, it is possible to appropriately set the adhesiveness with the molding resin while highly keeping the adhesiveness of the insulating film 2 with the base iron 1. For example, it is possible to enable to relieve the compressive stress, and to improve workability when an excessive molding resin is peeled off, and so on while securing the adhesiveness and so on required to fix the magnet. Incidentally, when the average particle size of the fluorine resin is not appropriate, there is a possibility in which the properties of the insulating film 2 vary because the fluorine resin disperses in the insulating film 2 unevenly.

Incidentally, when the surfactant, the inorganic compound, the organic low-molecular compound, or the like is added to the treatment solution, these are contained in the insulating film 2 as they are.

Besides, a thickness of the insulating film 2 is preferable to be approximately 0.3 µm to 3.0 µm, more preferable to be 0.5 µm or more, and 1.5 µm or less.

Incidentally, the average particle sizes of the colloidal silica, the average particle sizes of the acrylic resin, the epoxy resin, and the polyester resin, and the average particle size of the fluorine resin are the number-average particle sizes. As the number average particle size of the colloidal silica, for example, one measured by a nitrogen absorption method (JIS Z8830) is used. Further, as the number average particle sizes of the acrylic resin, the epoxy resin, the polyester resin and the fluorine resin, for example, ones measured by a laser diffraction method are used.

As the treatment solution, it is preferable to use one containing no Cr in consideration of environment.

Besides, it is preferable that the first component and the second component account for 90% or more of the insulating film 2. This is for securing good insulation performance, heat conductivity, heat resistance, and so on.

EXAMPLE

Next, experiments performed by the present inventors are described. Conditions and so on in these experiments are examples applied to verify execution possibilities and effects of the present invention, and the present invention is not limited to these examples.

A base iron having a composition for a non-oriented electrical steel sheet containing Si: 2.5%, Al: 0.5%, and Mn: 0.05% each in mass % was produced. The thickness of the base iron was 0.35 mm, and the centerline average roughness (Ra) was 0.46 µm.

Further, various solutions for the first component were prepared. The components of these solutions are presented in Table 1.

TABLE 1

| SOLUTION No. FOR FIRST COMPONENT | METAL PHOSPHATE OR COLLOIDAL SILICA | KIND OF ORGANIC RESIN | PART BY MASS OF ORGANIC RESIN | OTHER ADDITIVE |
|---|---|---|---|---|
| 1 | MAGNESIUM PHOSPHATE | ACRYLIC RESIN 1 | 20 | |
| 2 | ALUMINUM PHOSPHATE | ACRYLIC RESIN 1 | 7 | |
| 3 | MANGANESE PHOSPHATE | EPOXY RESIN 1 | 35 | |
| 4 | NICKEL PHOSPHATE | ACRYLIC RESIN 1 | 15 | |
| 5 | ALUMINUM PHOSPHATE + MAGNESIUM PHOSPHATE | POLYESTER RESIN | 15 | PHOSPHONIC ACID: 0.5 PARTS BY MASS |
| 6 | COLLOIDAL SILICA | EPOXY RESIN 1 | 45 | |
| 7 | COLLOIDAL SILICA | ACRYLIC RESIN 1 | 100 | |
| 8 | COLLOIDAL SILICA | EPOXY RESIN 1 | 330 | |
| 9 | MAGNESIUM PHOSPHATE | ACRYLIC RESIN 2 | 30 | |
| 10 | ALUMINUM PHOSPHATE | EPOXY RESIN 2 | 30 | |
| 11 | ALUMINUM PHOSPHATE | ACRYLIC RESIN 1 | 0.5 | |
| 12 | CALCIUM PHOSPHATE | POLYESTER RESIN | 60 | |
| 13 | ALUMINUM PHOSPHATE | AQUEOUS POLYURETHANE | 30 | |
| 14 | COLLOIDAL SILICA | EPOXY RESIN 2 | 30 | |
| 15 | COLLOIDAL SILICA | EPOXY RESIN 1 | 35 | |
| 16 | COLLOIDAL SILICA | ACRYLIC RESIN 1 | 430 | |
| 17 | MAGNESIUM CHROMATE | ACRYLIC RESIN 1 | 30 | |

Regarding the solutions containing a metal phosphate, an orthophosphoric acid and metal hydroxides such as $Mg(OH)_2$ and $Al(OH)_3$, a metal oxide and a metal carbonate were mixed and stirred, thereby preparing an aqueous solution of 40 mass %.

Regarding the solutions containing a colloidal silica, a solution containing 30 mass % of commercially available colloidal silica having an average particle size of 15 nm with a surface being modified by aluminum was prepared.

Details of the six kinds of organic resins in Table 1 are as follows.

[Acrylic Resin 1]

This is an acrylic resin obtained by copolymerizing methyl methacrylate: 40 mass %, 2-hydroxyethyl methacrylate: 10 mass %, n-butyl acrylate: 30 mass %, and styrene monomer: 20 mass %.

[Acrylic Resin 2]

This is an acrylic resin obtained by copolymerizing methyl acrylate: 40 mass %, styrene monomer: 30 mass %, isobutyl acrylate: 20 mass %, and fumaric acid: 10 mass %.

[Epoxy Resin 1]

This is a carboxyl-group denatured epoxy resin obtained by denaturing bisphenol A with triethanolamine and thereafter bringing succinic anhydride into reaction therewith.

[Epoxy Resin 2]

This is an epoxy resin obtained by blending an ethylene propylene block polymer with a phenol-novolac epoxy resin and adding nonylphenyl ether ethylene oxide thereto, thereby making it a self-emulsifying type.

[Polyester Resin]

This is a polyester resin containing a carboxyl-group obtained by copolymerizing dimethyl terephthalate: 35 mass % and neopentyl glycol: 35 mass % and thereafter graft polymerizing fumaric acid: 15 mass % and trimellitic anhydride: 15 mass %.

[Aqueous Polyurethane]

This is aqueous polyurethane synthesized from hexamethylene diisocyanate and polyethylene glycol by a known method.

These organic resins were each made as a 30% emulsion solution, and they were mixed with a solution containing the metal phosphate or the colloidal silica. Furthermore, a proper amount of viscosity improver and surfactant was added as necessary to prepare the solutions presented in Table 1.

Incidentally, average particle sizes of the acrylic resins 1, 2 were 0.25 µm, 0.64 µm, 0.6 µm, respectively. The average particle sizes of the epoxy resins 1, 2 were 0.33 µm, 0.76 µm, respectively, and the average particle size of the polyester resin was 0.35 µm, the average particle size of the aqueous polyurethane was 0.12 µm. In measurement of these average particle sizes, the resin emulsion was diluted with distilled water, and thereafter a number average particle size was measured with a commercially available particle size measuring apparatus using a laser diffraction method according to a JIS method (JIS Z8826). Incidentally, the parts by mass of resins in Table 1 are values converted into a solid content.

Then, predetermined amounts of dispersion or powder of the fluorine resins presented in Table 2 were added to the solutions presented in Table 1 so as to prepare 27 kinds of treatment solutions.

TABLE 2

| SAMPLE No. | SOLUTION No. FOR FIRST COMPONENT | KIND OF FLUORINE RESIN | ADDED AMOUNT OF FLUORINE RESIN (PART BY MASS) | BAKING CONDITION TEMPERATURE (° C.) | BAKING CONDITION TIME (SEC) | REMARKS |
|---|---|---|---|---|---|---|
| 1 | 1 | FLUORINE RESIN 1 | 3.5 | 320 | 20 | EXAMPLE |
| 2 | 2 | FLUORINE RESIN 2 | 5 | 280 | 30 | |
| 3 | 2 | FLUORINE RESIN 3 | 8 | 260 | 20 | |
| 4 | 3 | FLUORINE RESIN 6 | 5 | 300 | 15 | |
| 5 | 4 | FLUORINE RESIN 2 | 0.5 | 280 | 40 | |
| 6 | 4 | FLUORINE RESIN 2 | 2.5 | 330 | 35 | |
| 7 | 5 | FLUORINE RESIN 2 | 1 | 230 | 55 | |
| 8 | 6 | FLUORINE RESIN 2 | 3 | 200 | 40 | |
| 9 | 7 | FLUORINE RESIN 2 | 6 | 280 | 30 | |
| 10 | 8 | FLUORINE RESIN 2 | 3 | 300 | 20 | |
| 11 | 3 | FLUORINE RESIN 4 | 5 | 200 | 40 | COMPARATIVE |
| 12 | 3 | FLUORINE RESIN 5 | 5 | 280 | 30 | EXAMPLE |
| 13 | 9 | FLUORINE RESIN 4 | 5 | 300 | 15 | |
| 14 | 10 | FLUORINE RESIN 4 | 5 | 280 | 40 | |
| 15 | 11 | FLUORINE RESIN 2 | 2.5 | 330 | 15 | |
| 16 | 12 | FLUORINE RESIN 3 | 6 | 230 | 55 | |
| 17 | 13 | FLUORINE RESIN 2 | 5 | 260 | 20 | |
| 18 | 14 | FLUORINE RESIN 2 | 6 | 330 | 40 | |
| 19 | 15 | FLUORINE RESIN 2 | 6 | 260 | 35 | |
| 20 | 16 | FLUORINE RESIN 2 | 6 | 260 | 35 | |
| 21 | 1 | NONE | | 320 | 20 | |
| 22 | 2 | FLUORINE RESIN 1 | 0.04 | 200 | 36 | |
| 23 | 3 | FLUORINE RESIN 1 | 15 | 160 | 55 | |
| 24 | 2 | FLUORINE RESIN 2 | 20 | 280 | 30 | |
| 25 | 6 | FLUORINE RESIN 2 | 0.03 | 400 | 5 | |
| 26 | 7 | FLUORINE RESIN 2 | 12 | 230 | 30 | |
| 27 | 17 | NONE | | 330 | 30 | |

Details of the six kinds of fluorine resins in Table 2 are as follows.

[Fluorine Resin 1]

This is the dispersion of a fluorine resin in a polytetrafluoroethylene (PTFE) type, having the average particle size of 0.25 µm, and a concentration of 48 mass %.

[Fluorine Resin 2]

This is the dispersion of a fluorine resin in a fluorinated ethylene propylene (FEP) type, having the average particle size of 0.34 µm, and the concentration of 50 mass %.

[Fluorine Resin 3]

This is the dispersion of a fluorine resin made to be a water dispersion type by a forced emulsification, having the average particle size of 0.12 µm, and the concentration of 60 mass %.

[Fluorine Resin 4]

This is the powder of the fluorine resin in a fluorine rubber type, having the average particle size of 2.5 µm.

[Fluorine Resin 5]

This is the dispersion of the fluorine resin in a hydroxyl group grafted type, having the average particle size of 0.06 μm, and the concentration of 48 mass %.

[Fluorine Resin 6]

This is the powder of the fluorine resin compounding PTFE, having the average particle size of 0.33 μm and vinylidene fluoride having the average particle size of 0.25 μm.

Incidentally, in measurement of the average particle size of the emulsion of the organic resin, the resin emulsion was diluted with distilled water, and thereafter a number average particle size was measured with the commercially available particle size measuring apparatus using the laser diffraction method according to the JIS method (JIS Z8826). Besides, in measurement of the average particle size of the powder of the fluorine resin, the powder is dispersed in the distilled water by an ultrasonic washing machine for approximately one minute, and thereafter a number average particle size was measured with the commercially available particle size measuring apparatus using the laser diffraction method according to the JIS method (JIS Z8826). Moreover, the centerline average roughness (Ra) is measured by using a commercially available surface roughness measuring apparatus according to a JIS method (JIS B0601) as for the surface roughness.

Then the treatment solutions are applied on the base iron and baked under the conditions presented in Table 2. The treatment solutions were applied using the roll coater. At this time, the amount of pressing down with the roll and so on were adjusted so that a thickness of the insulating film becomes approximately 0.8 μm. The baking (drying) was performed using the radiation furnace, and the setting of the furnace temperature was adjusted so as to obtain the predetermined heating conditions noted in Table 2. They were adjusted so that the sheet temperatures reached were 160° C. to 400° C., and the baking times were five seconds to 55 seconds.

Then, various properties of the electrical steel sheets obtained after the baking was finished were evaluated. Specifically, evaluations were performed on removability of the molding resin, insulation performance, adhesiveness, corrosion resistance, appearance, and heat resistance.

In evaluation of the removability of the molding resin, samples of two pieces of electrical steel sheets sandwiching the powder of the molding resin of 0.05 g was heated to 150° C., held for one minute with a pressurizing force of 10 kgf/cm$^2$, air-cooled, and shearing tensile strength was measured. The measurement of the shearing tensile strength was performed according to a JIS method (JIS K6850), and the shearing tensile strength was set to be a molding resin adhesive force. Incidentally, 1 kgf/cm$^2$ is approximately 9.8 N/cm$^2$. When the shearing tensile strength is 10 kgf/cm$^2$ or less, it can be said that the removability of the molding resin is good. On the other hand, when the shearing tensile strength exceeds 10 kgf/cm$^2$, there is a possibility in which magnetism deteriorates by the molding resin, besides, there is a possibility in which workability when adherents are removed and so on deteriorates if it is used for the fixing of the magnet.

In evaluation of the insulation performance, interlayer resistance was measured according to a JIS method (JIS C2550). Then, one with interlayer resistance of less than 5Ω·cm$^2$/piece was evaluated as x, one with interlayer resistance of 5Ω·cm$^2$/piece to 10Ω·cm$^2$/piece was evaluated as Δ, one with interlayer resistance of 10Ω·cm$^2$/piece to 50Ω·cm$^2$/piece was evaluated as ○, and one with interlayer resistance of 50Ω·cm$^2$/piece or more was evaluated as ⊚.

In evaluation of the adhesiveness, an adhesive tape was put on electrical steel sheet samples, and thereafter they were wrapped around metal bars having a diameter of 10 mm, 20 mm, 30 mm. Then the adhesive tape was peeled off, and the adhesiveness was evaluated from the peeled state. One which did not peel when wrapped around the metal bar having the diameter of 10 mm was evaluated as 10 mmφ OK, and one which did not peel when wrapped around the metal bar having the diameter of 20 mm was evaluated as 20 mmφ OK. Further, one which did not peel when wrapped around the metal bar having the diameter of 30 mm was evaluated as 30 mmφ OK, and one which peeled off when wrapped around the metal bar having the diameter of 30 mm was evaluated as 30 mmφ OUT.

The corrosion resistance was evaluated according to a salt spray test of JIS method (JIS Z2371). Samples after 7 hours elapsed were used to perform 10-point evaluation. Criteria of evaluation are as follows.

10: No rust occurred

9: Slight rust occurred (0.1% or less in area ratio)

8: Area ratio of rust occurred=more than 0.1% and 0.25% or less

7: Area ratio of rust occurred=more than 0.25% and 0.50% or less

6: Area ratio of rust occurred=more than 0.50% and 1% or less

5: Area ratio of rust occurred=more than 1% and 2.5% or less

4: Area ratio of rust occurred=more than 2.5% and 5% or less

3: Area ratio of rust occurred=more than 5% and 10% or less

2: Area ratio of rust occurred=more than 10% and 25% or less

1: Area ratio of rust occurred=more than 25% and 50% or less

In evaluation of the appearance, one which was glossy, smooth and even was evaluated as 5, one which was glossy but less even was evaluated as 4, one which was slightly glossy and smooth but poor in evenness was evaluated as 3, one which had low gloss, slightly poor in smoothness and poor in evenness was evaluated as 2, and one which was poor in gloss, evenness, and smoothness was evaluated as 1.

As for the heat resistance, a 2 mm×30 mm gauze was rubbed on an electrical steel sheet surface with a load of 100 gf (approximately 0.98 N), and the heat resistance was evaluated based on a peeling state of the insulating film. One which did not peel was evaluated as 5, one which slightly peeled was evaluated as 4, one which clearly peeled was evaluated as 3, one which severely peeled was evaluated as 2, and one which peeled without being rubbed with the gauze was evaluated as 1.

These evaluation results are presented in Table 3.

TABLE 3

| SAMPLE No. | molding resin adhesive force (kgf/cm²) | INSULATION PERFORMANCE | ADHESSIVENESS | CORRISION RESISTANCE | APPEARANCE | HEAT RESISTANCE | REMARKS |
|---|---|---|---|---|---|---|---|
| 1 | 6.4 | ⊚ | 20 mmφOK | 10 | 5 | 5 | EXAMPLE |
| 2 | 6.1 | ⊚ | 20 mmφOK | 10 | 5 | 5 | |
| 3 | 4.4 | ○ | 20 mmφOK | 9 | 5 | 5 | |
| 4 | 5.4 | ○ | 20 mmφOK | 10 | 4 | 5 | |
| 5 | 8.2 | ⊚ | 20 mmφOK | 7 | 5 | 5 | |
| 6 | 5.3 | ⊚ | 20 mmφOK | 9 | 4 | 4 | |
| 7 | 7.6 | ○ | 20 mmφOK | 7 | 5 | 4 | |
| 8 | 6.3 | ○ | 20 mmφOK | 8 | 4 | 4 | |
| 9 | 7.2 | ○ | 20 mmφOK | 9 | 4 | 5 | |
| 10 | 7.5 | ○ | 30 mmφOK | 7 | 4 | 5 | |
| 11 | 16.5 | ○ | 30 mmφOUT | 7 | 2 | 4 | COMPARATIVE |
| 12 | 14.3 | ○ | 30 mmφOUT | 8 | 2 | 4 | EXAMPLE |
| 13 | 13.3 | ⊚ | 30 mmφOK | 2 | 5 | 4 | |
| 14 | 11.2 | ○ | 30 mmφOK | 4 | 3 | 2 | |
| 15 | 13.9 | ○ | 30 mmφOUT | 3 | 3 | 4 | |
| 16 | 10.1 | Δ | 30 mmφOK | 6 | 2 | 1 | |
| 17 | 14.7 | ⊚ | 30 mmφOUT | 3 | 4 | 4 | |
| 18 | 13.3 | ⊚ | 30 mmφOUT | 2 | 3 | 3 | |
| 19 | 8.7 | ○ | 30 mmφOK | 7 | 3 | 1 | |
| 20 | 16.5 | Δ | 20 mmφOK | 2 | 4 | 3 | |
| 21 | 20.3 | ○ | 30 mmφOK | 8 | 4 | 4 | |
| 22 | 18.6 | ○ | 30 mmφOK | 7 | 2 | 4 | |
| 23 | 12.2 | Δ | 30 mmφOUT | 5 | 4 | 4 | |
| 24 | 8.1 | ○ | 30 mmφOUT | 7 | 4 | 5 | |
| 25 | 16.7 | Δ | 30 mmφOK | 7 | 3 | 4 | |
| 26 | 9.2 | ⊚ | 20 mmφOK | 5 | 2 | 3 | |
| 27 | 6.5 | ○ | 30 mmφOK | 8 | 5 | 5 | |

As presented in Table 3, the effects of the present invention were clear in this experiment. Specifically, as presented in Table 3, in the samples corresponding to the examples of the present invention, the adhesiveness of the molding resin was 10 kgf/cm² or less, and it can be said that there is the excellent removability of the molding resin. Besides, it was also clear that the samples corresponding to the examples of the present invention also excelled in the insulation performance, adhesiveness, corrosion resistance, appearance and heat resistance in addition to the removability of the molding resin. Further, in many of the samples corresponding to the comparative examples, the adhesiveness of the molding resins were large values higher than 10 kgf/cm², and none of them excelled in all of the insulation performance, adhesiveness, corrosion resistance, appearance and heat resistance.

As has been described, in the electrical steel sheet according to the embodiment of the present invention, the removability of the molding resin is good, iron loss properties of the laminated iron core improve, and insulating film properties of the electrical steel sheet are good in, for example, the laminated iron core in molding and so on.

In the foregoing, the preferred embodiment of the present invention has been described in detail, but the invention is not limited to such an example. It is clear that any person having common knowledge in the art to which the invention pertains will be able to contrive various examples of changes and modifications within the category of the technical idea described in the claims, and it is understood that such changes and modifications naturally belong to the technical scope of the present invention.

INDUSTRIAL APPLICABILITY

The present invention may be used in, for example, electrical steel sheet manufacturing industry and electrical steel sheet utilizing industry.

The invention claimed is:
1. A non-oriented electrical steel sheet, comprising:
a base iron; and
an insulating film having a thickness of 0.3 μm to 0.8 μm directly formed on a surface of the base iron;
wherein the insulating film contains:
a first component: 100 parts by mass, the first component containing:
a metal phosphate: 100 parts by mass;
one or more resins selected from the group consisting of an acrylic resin, an epoxy resin and a polyester resin which have an average particle size of 0.05 μm to 0.50 μm in an amount of 1 part by mass to 50 parts by mass; and
a phosphonic acid;
a second component comprising dispersion or powder of a fluorine resin having an average particle size of 0.05 μm to 0.35 μm in an amount of 0.5 parts by mass to 10 parts by mass; and
other component comprising one or more selected from the group consisting of titanate and tungstate;
wherein the fluorine resin is one or more of tetrafluoroethylene-perfluoroalkylvinyl ether copolymer, tetrafluoroethylene-ethylene copolymer, or chlorotrifluoroethylene-ethylene copolymer,
wherein the non-oriented electrical steel sheet has interlayer resistance of 10Ω·cm²/piece or more, and
wherein the base iron comprises 0.1-4.0 mass % Si, 0.05-3.0 mass % Al, 0.01-1.0 mass % Mn, 0.01-1.0 mass % Sn, less than 100 ppm S, less than 100 ppm N, less than 100 ppm C, and a balance comprising Fe and inevitable impurities.

* * * * *